United States Patent
Han (10) Patent No.: US 9,442,546 B2
(45) Date of Patent: Sep. 13, 2016

(54) COMPUTING SYSTEM AND METHOD FOR RESPECTIVELY DISPLAYING INFORMATION CORRESPONDING TO HOST COMPUTER UNDER BOOTING STATE OR STANDBY STATE

(71) Applicants: Inventec (Pudong) Technology Corporation, Shanghai (CN); INVENTEC CORPORATION, Taipei (TW)

(72) Inventor: Ying-xian Han, Shanghai (CN)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 122 days.

(21) Appl. No.: 14/583,443

(22) Filed: Dec. 26, 2014

(65) Prior Publication Data
US 2016/0116955 A1   Apr. 28, 2016

(30) Foreign Application Priority Data

Oct. 28, 2014  (CN) .......................... 2014 1 0587101

(51) Int. Cl.
*G06F 1/26* (2006.01)
*G06F 3/147* (2006.01)
*G09G 5/00* (2006.01)
*G06F 9/44* (2006.01)

(52) U.S. Cl.
CPC ................. *G06F 1/26* (2013.01); *G06F 1/263* (2013.01); *G06F 3/147* (2013.01); *G06F 9/4418* (2013.01); *G09G 5/006* (2013.01)

(58) Field of Classification Search
CPC ..................................................... G06F 9/4418
See application file for complete search history.

(56) References Cited

U.S. PATENT DOCUMENTS

| | | | |
|---|---|---|---|
| 2005/0195075 A1* | 9/2005 | McGraw .................. | G06F 1/18 340/500 |
| 2008/0005222 A1* | 1/2008 | Lambert ............... | G06F 3/0227 709/203 |

* cited by examiner

*Primary Examiner* — Albert Wang
(74) *Attorney, Agent, or Firm* — Muncy, Geissler, Olds & Lowe, P.C.

(57) ABSTRACT

A computing system and method for respectively displaying information corresponding to host computer under booting state or standby state is disclosed in the present invention. In the method, the computing system is provided to determine whether the host computer is under a booting state or a standby state. When the host computer is under the booting state, a display module of the computing system displays the control information of the baseboard management controller. When the host computer is under the standby state, the display module displays the information about BIOS Power-on self-test (POST).

17 Claims, 7 Drawing Sheets

COMPUTING SYSTEM AND METHOD FOR RESPECTIVELY DISPLAYING INFORMATION CORRESPONDING TO HOST COMPUTER UNDER BOOTING STATE OR STANDBY STATE

FIELD OF THE INVENTION

The present invention is related to a computing system and a method for respectively displaying information corresponding to a host computer under booting state or standby state, and more particularly related to a computing system and a method for respectively displaying information corresponding to the host computer according to the condition of booting state and the standby state of the host computer.

BACKGROUND OF THE INVENTION

Servers are the most important apparatuses for supporting network services. Generally, the servers in present can only have the display to show the related controlling information, hardware information, software/firmware version, and etc. under the booting state. That is, the user can only access the information corresponding to the server as the server is booted normally. However, as the server is under the standby state (e.g. the server has been shut down), the user cannot access the information related to the server. If the user needs to know such information, he has to boot the server again. Thus, the method in present is time-wasting and needs to be improved.

BRIEF SUMMARY OF INVENTION

In views of the servers in present, which can be triggered to display the corresponding information under the booting state but fail to display the corresponding information under the standby state, there exist the problems common to the user that the operation is inconvenient and the operating efficiency is low. Accordingly, a computing system and a method for respectively displaying information corresponding to the host computer under the booting state or the standby state is provided in accordance with the present invention, which respectively deals with the displayed corresponding information through determining if the host computer is under the booting state or the standby state.

A computing system for respectively displaying information corresponding to a host computer under a booting state or a standby state is provided in accordance with the major technical feature of the present invention. The computing system comprises a host computer power management module, an operating module, and a displaying module. The host computer power management module is configured to output a first level displaying power management signal when the host computer is under the standby state and output a second level displaying power management signal when the host computer is under the booting state. The operating module is electrically connected to the host computer power management module and configured to receive and process the first level displaying power management signal to output a first displaying power when the host computer is under the standby state, and receive and process the second level displaying power management signal to output a second display power when the host computer is under the booting state. The displaying module is electrically connected to the operating module and configured to receive a displaying signal and the first displaying power and output a displaying information with content being controlled by a baseboard management controller (BMC) when the host computer is under standby state, and receive the displaying signal and the second displaying power and output a displaying information of Basic Input/Output System (BIOS) power-on self test (POST) when the host computer is under the booting state.

In accordance with a preferred embodiment of the computing system for respectively displaying information corresponding to a host computer under a booting state or a standby state, the displaying signal is a Video Graphics Array (VGA) signal, a High Definition Multimedia Interface (HDMI) signal, or a Digital Visual Interface (DVI) signal, and the displaying signal is outputted by at least one selected from a group including the Baseboard Management Controller (BMC), a displaying signal controller, and a Complex Programmable Logic Device (CPLD). As a preferred embodiment, the Baseboard Management Controller outputs the content controlled by the Baseboard Management Controller directly, or outputs the content controlled by the Baseboard Management Controller after being processed by the displaying signal controller, or outputs the content controlled by the Baseboard Management Controller after being processed by the Complex Programmable Logic Device. In addition, the displaying signal controller is a VGA controller, a HDMI controller, or a DVI controller.

In accordance with a preferred embodiment of the computing system for respectively displaying information corresponding to a host computer under a booting state or a standby state, the content of the displaying signal is at least one selected from a group including structural information of the Baseboard Management Controller, daily record of the Baseboard Management Controller, and structural information of a Complex Programmable Logic Device. The first displaying power is a system AC power, and the second displaying power is a system DC power. In addition, the operating module comprises a signal control unit, a first level converting unit, and a second level converting unit. The signal control unit is configured to receive a first level displaying power enable signal and the first level displaying power management signal to output a first level displaying power state signal when the host computer is under the standby state, and receive a second level displaying power enable signal and the second level displaying power management signal to output a second level displaying power state signal when the host computer is under the booting state. The first level converting unit is configured to receive the first level displaying power management signal and the first level displaying power state signal to output the first displaying power when the host computer is under the standby state, and receive the second level displaying power management signal and the second level displaying power state signal to cease the output when the host computer is under the booting state. The second level converting unit is configured to receive the first level displaying power state signal to cease the output when the host computer is under the standby state, and receive the second level displaying power state signal to output the second displaying power when the host computer is under the booting state.

In accordance with a preferred embodiment of the computing system for respectively displaying information corresponding to a host computer under a booting state or a standby state, the displaying module comprises a displaying signal port protector, and a displaying signal port connector. The displaying signal port protector is configured to receive and process the displaying signal to output a displaying protecting signal. The displaying signal port connector is electrically connected to a displaying apparatus and configured to receive and transmit the displaying protecting signal to the displaying apparatus. The displaying signal port protector and the displaying signal port connector receive and output the first displaying power to the displaying apparatus when the host computer is under the standby state, and the displaying signal port protector and the displaying signal port connector receive and output the second displaying power to the displaying apparatus when the host computer is under the booting state.

A method for respectively displaying information corresponding to a host computer under a booting state or a standby state is also provided in accordance with the major technical feature of the present invention. In the beginning, the method determines if the host computer is under the standby state or the booting state. If the determination shows to be under the standby state, a first level displaying power management signal is outputted. Then, the first level displaying power management signal is received and processed to output a first displaying power. Afterward, a displaying signal and the first displaying power are received, and a displaying information with content controlled by a Baseboard Management Controller (BMC) is outputted. If the determination shows to be under the booting state, a second level displaying power management signal is outputted. Then, the second level displaying power management signal is received and processed to output a signal displaying power. Afterward, the displaying signal and the second displaying power are received to output a displaying information of Basic Input/Output System (BIOS) power-on self test (POST).

In accordance with a preferred embodiment of the method for respectively displaying information corresponding to a host computer under a booting state or a standby state, no matter the determination shows to be under the standby state or the booting state, the displaying signal is a VGA signal, a HDMI signal, or a DVI signal, and the displaying signal is outputted by at least one selected from a group including the Baseboard Management Controller (BMC), a displaying signal controller, and a Complex Programmable Logic Device (CPLD). In addition, the displaying signal controller is a VGA controller, a HDMI controller, or a DVI controller, and the content of the displaying signal is at least one of the information selected from a group including structural information of the Baseboard Management Controller, daily record of the Baseboard Management Controller, and structural information of a Complex Programmable Logic Device.

In accordance with a preferred embodiment of the method for respectively displaying information corresponding to a host computer under a booting state or a standby state, as the determination shows to be under the standby state, the Baseboard Management Controller outputs the content controlled by the Baseboard Management Controller directly, or outputs the content controlled by the Baseboard Management Controller after being processed by the displaying signal controller, or outputs the content controlled by the Baseboard Management Controller after being processed by the Complex Programmable Logic Device. In addition, as the determination shows to be under the standby state, the method further comprises outputting a first level displaying power enable signal, and further comprises receiving the first level displaying power enable signal, outputting a first level displaying power state signal according to the first level displaying power enable signal and the first level displaying power management signal, and finally receiving the first level displaying power management signal and the first level displaying power state signal to output the first displaying power.

In accordance with a preferred embodiment of the method for respectively displaying information corresponding to a host computer under a booting state or a standby state, as the determination shows to be under the booting state, the method further comprises outputting a second level displaying power enable signal, further comprises receiving the second level displaying power enable signal, outputting a second level displaying power state signal according to the second level displaying power enable signal and the second level displaying power management signal, and finally receiving the second level displaying power state signal to output the second displaying power.

By using the computing system and the method for respectively displaying information corresponding to a host computer under a booting state or a standby state provided in accordance with the present invention, because the user can access the corresponding displaying information from the host computer no matter the host computer is under the booting state or the standby state, thus, the user can know the information without the need to reboot the host computer as the host computer is under the standby state such that the operating efficiency can be enhanced and the operation would be more convenient for the user.

The embodiments adopted in the present invention would be further discussed by using the flowing paragraph and the figures for a better understanding.

DETAILED DESCRIPTION OF THE INVENTION

There are various embodiments of the computing system and the method for respectively displaying information corresponding to a host computer under a booting state or a standby state provided in accordance with the present invention, which are not repeated hereby. Four preferred embodiments of the computing system and one preferred embodiment of the displaying method are mentioned in the following paragraph as examples.

Figure 1:
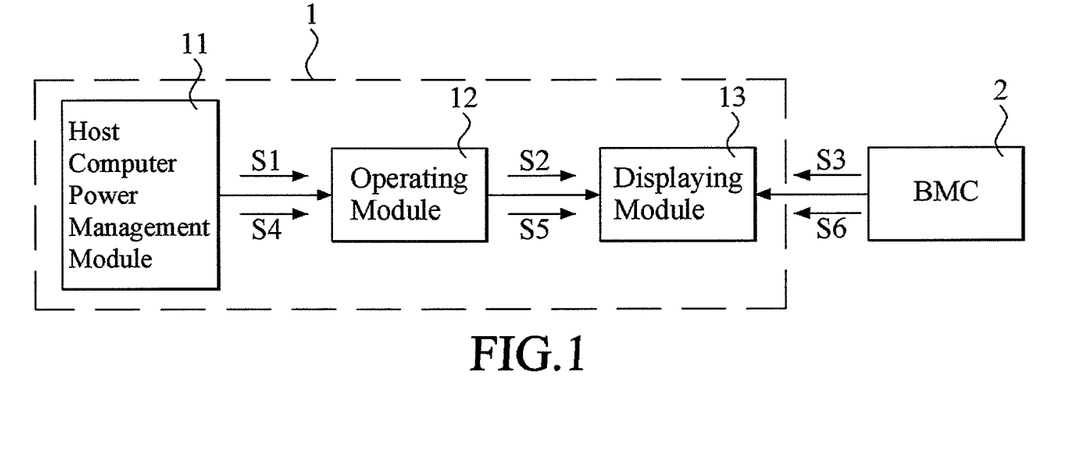
FIG. 1 is a block diagram showing the computing system for respectively displaying information corresponding to a host computer under a booting state or a standby state in accordance with a first embodiment of the present invention.

FIG. 1 is a block diagram showing the computing system for respectively displaying information corresponding to a host computer under a booting state or a standby state in accordance with a first embodiment of the present invention. As shown, the computing system 1 for respectively displaying information corresponding to a host computer under a booting state or a standby state (hereinafter the computing system) may be a system composed of the internal electronic devices of a server (i.e. the server itself), or a system integrated in a chip for further implemented into the server. The computing system 1 comprises a host computer power management module 11, an operating module 12, and a displaying module 13. The host computer power management module 11 is electrically connected to the operating module 12, and the operating module 12 is electrically connected to the displaying module 13. In addition, the displaying module 13 is electrically connected to a Baseboard Management Controller (BMC) 2.

The host computer power management module 11 is capable of detecting and determining the operating condition of the host computer (i.e. the server in the provided preferred embodiments, however, the present invention is not so restricted). For example, in accordance with the preferred embodiment of the present invention, the host computer power management module 11 determines if the host computer is under the standby state or the booting state and the determination is made based on the electric level of the power voltage for example. However the present invention is not so restricted. In addition, in accordance with the preferred embodiment of the present invention, the standby state indicates that the host computer has been shut down in a narrow sense, or under the abnormal operating state in a broad sense, such as the sleep state or the pause state.

As the host computer power management module 11 determines that the host computer is under the standby state, a first level displaying power management signal S1 is transmitted to the operating module 12. The first level displaying power management signal S1 is a low level signal (i.e. a low voltage level signal).

After the operating module 12 receives the first level displaying power management signal S1, the operating module 12 processes the first level displaying power management signal S1 so as to output a first displaying power S2. Concretely speaking, the first displaying power S2 may be a system AC power, which is the power generated through converting the external commercial power received by the computing system 1 directly.

The displaying module 13 receives a displaying signal S3 outputted from the BMC 2 and the first displaying power S2 outputted by the operating module 12 so as to output the displaying information with content controlled by the BMC 2. The displaying signal S3 may be a Video Graphics Array (VGA) signal, a High Definition Multimedia Interface (HDMI) signal, or a Digital Visual Interface (DVI) signal. However, the present invention is not so restricted. In addition, the content of the displaying signal 3 may be at least one selected from the group including the structural information of the BMC 2 and the daily record of the BMC 2. That is, after the displaying module 13 receives the displaying signal S3 and the first displaying power S2, the displaying information with the content controlled by the BMC2 as the host computer is under the standby state (i.e. the screen image shown in FIG. 4, but the CPLD information may be excluded) is triggered and displayed on the displaying module 13. The displaying information may include serial number, internet address, host computer name, firmware version, memory address, and log events etc. However, the present invention is not so restricted.

In addition, if the host computer power management module 11 determines that the host computer is under the booting state (in general, the determination is made by detecting that the host computer under the standby state is changed to be under the booting state), a second level displaying power management signal S4 is outputted. The second level displaying power management signal S4 is a high level signal (i.e. the high voltage level signal, which indicates that the voltage level of the second level displaying power management signal S4 is higher than the first level displaying power management signal S1).

The operating module 12 receives and processes the second level displaying power management signal S4 to output a second displaying power S5. The second displaying power is a system DC power, which is the power generated through the power conversion after the host computer has been booted. The system AC power and the system DC power are two co-existed power supplying circuits. That is, after the host computer has been booted, the power supplied to the displaying module 13 would be shifted from the first displaying power S2 to the second displaying power S5. In addition, if there exists an external displaying apparatus (not shown in FIG. 1), which consumes more power, it is demanded to shift the power supply from the system AC power to the system DC power because the power provided by the system AC power is smaller.

Similarly, the displaying module 13 receives the displaying signal S6 transmitted from the BMC 2 directly and the second displaying power S5 transmitted from the operating module 12 so as to output the displaying information of Basic Input/Output System (BIOS) Power-on self test (POST). It should be noted that, the displaying signal S6 is identical to the displaying signal S3, and thus in practice, the displaying module 13 can display the above mentioned information such as serial number, internet address, host computer name, firmware version, memory address, and log events etc., and further display the information of BIOS POST (i.e. the information shown in the ordinary booting process).

Figure 2:
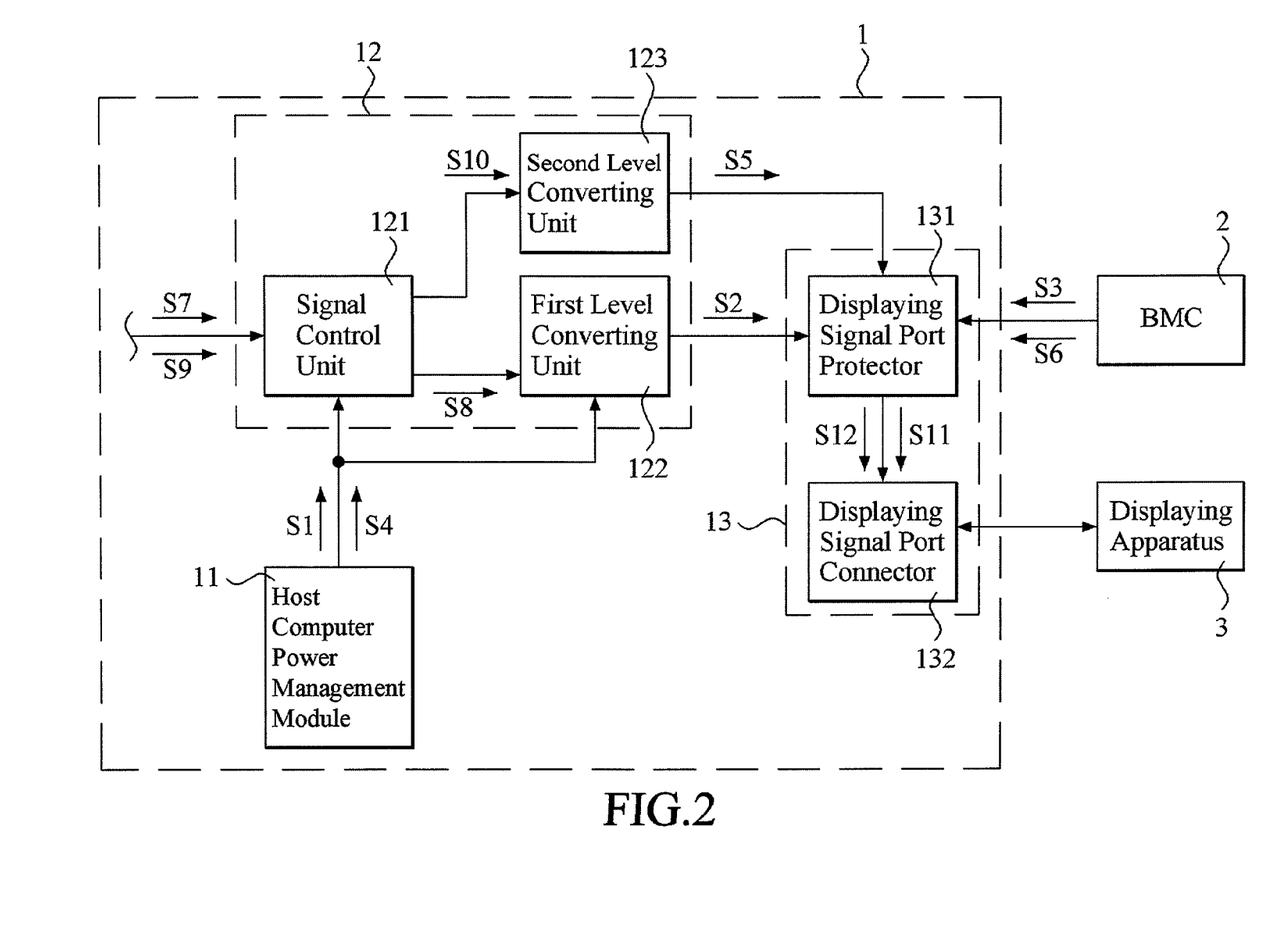
FIG. 2 is a block diagram showing the computing system for respectively displaying information corresponding to a host computer under a booting state or a standby state in accordance with a second embodiment of the present invention.
Figure 3:
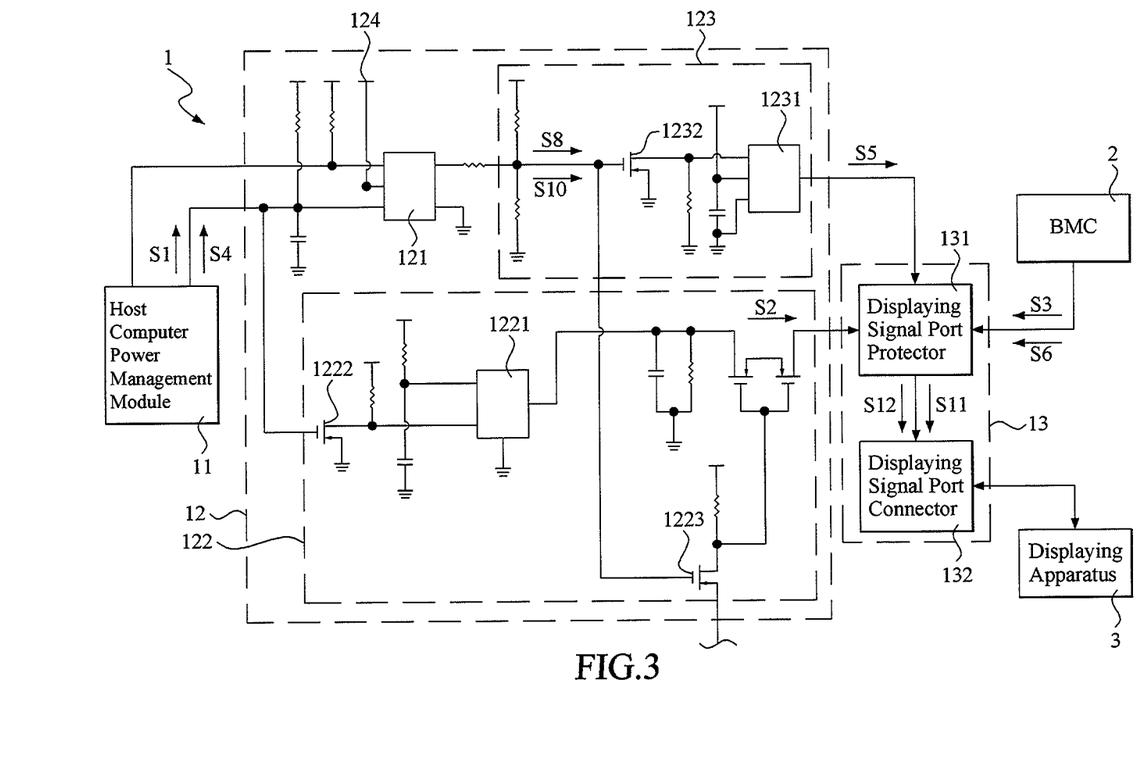
FIG. 3 is a circuit diagram showing the computing system for respectively displaying information corresponding to a host computer under a booting state or a standby state in accordance with the second embodiment of the present invention.
Figure 4:
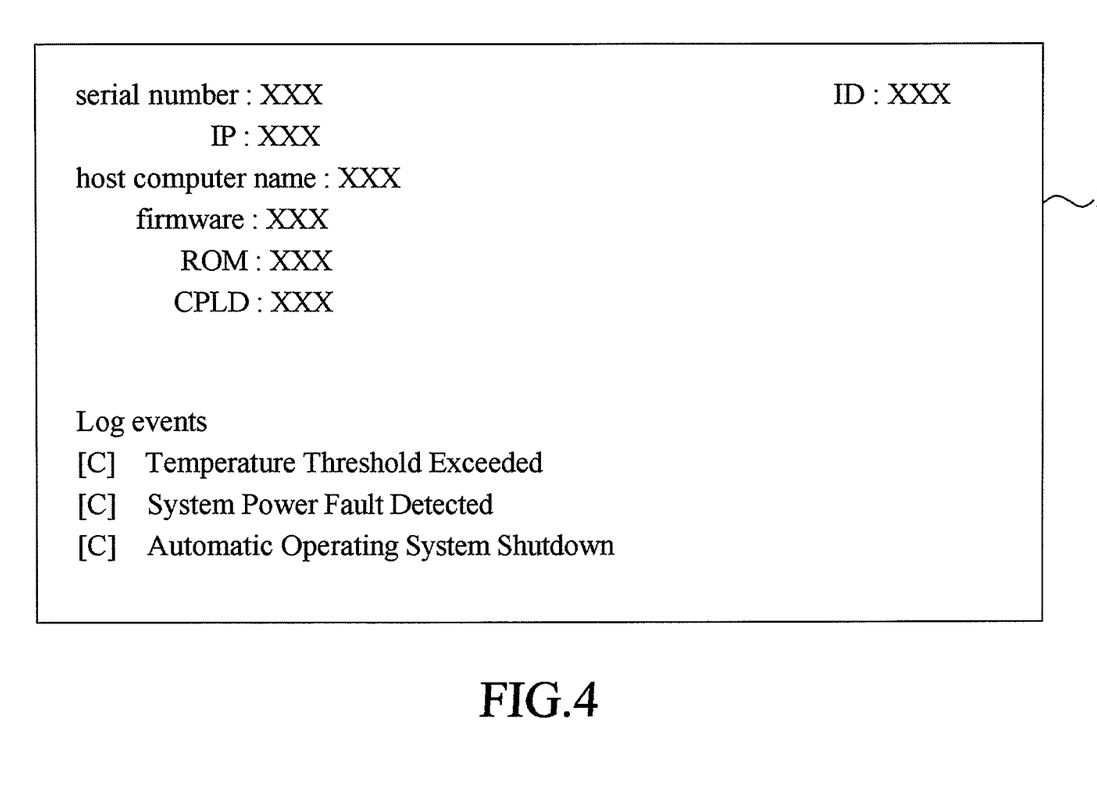
FIG. 4 is a schematic view showing the displaying information of the computing system for respectively displaying information corresponding to a host computer under a booting state or a standby state as the host computer is under the standby state in accordance with the second embodiment of the present invention.

Please refer to FIGS. 2 to 4, wherein FIG. 2 is a block diagram showing the computing system for respectively displaying information corresponding to a host computer under a booting state or a standby state in accordance with a second embodiment of the present invention, FIG. 3 is a circuit diagram showing the computing system for respectively displaying information corresponding to a host computer under a booting state or a standby state in accordance with the second embodiment of the present invention, and FIG. 4 is a schematic view showing the displaying information of the computing system for respectively displaying information corresponding to a host computer under a booting state or a standby state as the host computer is under the standby state in accordance with a second embodiment of the present invention.

As shown, the second preferred embodiment has the detailed circuit of the first preferred embodiment. The differences between the second preferred embodiment and the first preferred embodiment are the elements included in the operating module 12 and the displaying module 13 of the second preferred embodiment, i.e. the second embodiment can be regarded as the extension of the first preferred embodiment. The following paragraphs would describe the second preferred embodiment of the present invention on the basis similar to that of the first preferred embodiment.

In the second preferred embodiment, the operating module 12 includes a signal control unit 121, a first level converting unit 122, and a second level converting unit 123. The signal control unit 121 is electrically connected to the host computer power management module 11. The signal control unit 121 may be a logic gate, such as the NC7SZ5 series logic gate provided by Fairchild Semiconductor. However, the present invention is not so restricted. The operating module 12 may be other integrating circuits (ICs) in accordance with other embodiments of the present invention, and the logic gate may possess the input/output (JO) pins such as VCC, GND, and etc. in general, and it should be noted that FIG. 3 does not show all the pins of the logic gate.

The first level converting unit 122 is electrically connected to the host computer power management module 11, and both the first level converting unit 122 and the second level converting unit 123 are electrically connected to the signal control unit 121. The first level converting unit 122 and the second level converting unit 123 may be the existed ICs. The first level converting unit 122 includes a logic gate 1221, a transistor 1222 electrically connected to the logic gate 1221, another transistor 1223, a passive electronic unit (not shown in this figure) such as a resistor or a capacitor, and a voltage power source (not shown in this figure), and the second level converting unit 123 includes a logic gate 1231, a transistor 1232 electrically connected to the logic gate 1231 and the transistor 1223. Similarly, the logic gates 1221 and 1231 possess the IO pins of VCC, GND and etc. in general, and it should be noted that FIG. 3 does not show all the pins of the logic gate.

Moreover, the displaying module 13 includes a displaying port protector 131 and a displaying port connector 132. The displaying port protector 131 can be an ordinary protecting circuit, such as a VGA protector (e.g. the protector MAX4895). The displaying port connector 132 is electrically connected to the displaying port protector 131, the first level converting unit 122, the second level converting unit 123, and the BMC 2. The displaying port connector 132 can be a physical connector, and can support transmission of the signals with the formats of VGA, HDMI, or DVI. In the second preferred embodiment, the displaying port connector 132 supporting transmission of VGA signal is shown as an example. However, the present invention is not so restricted. In addition, the displaying signal port connector 132 is electrically connected to a displaying apparatus 3, which might be an external apparatus, such as a liquid crystal display, a light-emitting diode (LED) display, an organic light-emitting diode (OLED) display or an active matrix organic light-emitting diode (AMOLED) display, but the present invention is not so restricted.

As the host computer power management module 11 determines that the host computer is under the standby state, the first level displaying power management signal S1 is also transmitted to the signal control unit 121. The signal control unit 121 also receives a first level displaying power enable signal S7 other than the first level displaying power management signal S1. The first level displaying power enable signal S7 may be transmitted from the voltage power source 124. However, the present invention is not so restricted.

After receiving the first level displaying power management signal S1 and the first level displaying power enable signal S7, the signal control unit 121 processes the signals and outputs a first level displaying power state signal S8. In addition, the first level converting unit 122 receives the first level displaying power state signal S8 and the first level displaying power management signal S1 so as to process and output the first displaying power S2 and transmit the first displaying power S2 to the displaying signal port protector 131.

After the displaying signal port protector 131 receives the first displaying power S2, the first display power S2 would be transmitted to the displaying apparatus 3 through the displaying signal port connector 132 so as to trigger the displaying apparatus 3 to display the screen image as shown in FIG. 4 (the CPLD information can be displayed in accordance with the second preferred embodiment).

Please further refer to FIG. 3, it should be noted that the second level converting unit 123 receives the first level displaying power state signal S8 as the host computer is under the standby state to cut off the output of the transistor 1232 such that the first level displaying power state signal S8 would not trigger the second level converting unit 123 to output any signal.

As the host computer power management module 11 determines that the host computer is under the booting state, the second level displaying power management signal S4 would be transmitted to the signal control unit 121. Other than the second level displaying power management signal S4, the signal control unit 121 also receives a second level displaying power enable signal S9 transmitted from the voltage power source 124.

After receiving the second level displaying power management signal S4 and the second level displaying power enable signal S9, the signal control unit 121 processes the signals and outputs a second level displaying power state signal S10. In addition, the second level converting unit 123 receives the second level displaying power state signal S10 so as to process and output the second displaying power S5 and transmit the second displaying power S5 to the displaying signal port protector 131.

After the displaying signal port protector 131 receives the second displaying power S5, the second displaying power S5 would be transmitted to the displaying apparatus 3 through the displaying signal port connector 132 so as to trigger the displaying apparatus 3 to display the displaying information of BIOS POST (i.e. the information shown in the ordinary booting process), and also display the information such as the above mentioned serial number, internet address, host computer name, firmware version, memory address, daily record, and etc.

It should be noted that, as the host computer is under the booting state, the first level converting unit 122 would receive the second level displaying power management signal S4 and the second level displaying power state signal S10, but cannot be used to turn on the however, the transistors 1222 and 1223 respectively such that output of the first level converting unit 122 would be cut off and has no output signal generated.

In addition, it should be noted that no matter the host computer is under the standby state or the booting state, the displaying signal port protector 131 would receive the displaying signals S3 and S6, process the protecting operation, and output the displaying protection signals S11 and S12 respectively. Then, the displaying signal port connector 132 will receive the displaying protection signals S11 and S12, and transmit them to the displaying apparatus 3 respectively.

Figure 5:
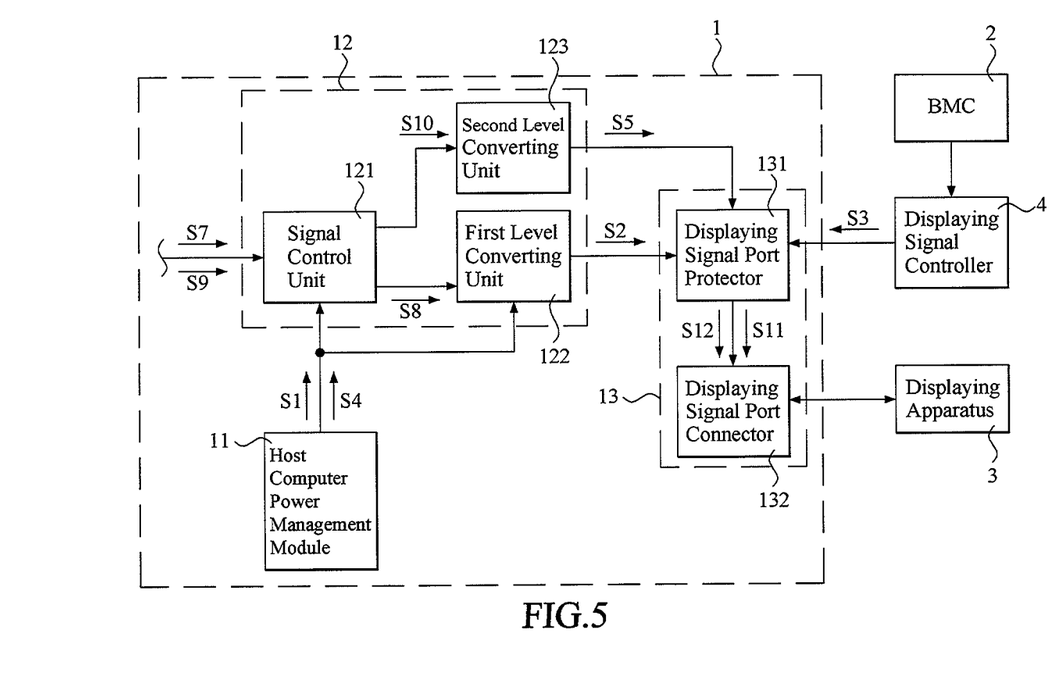
FIG. 5 is a block diagram showing the computing system for respectively displaying information corresponding to a host computer under a booting state or a standby state in accordance with a third embodiment of the present invention.

FIG. 5 is a block diagram showing the computing system for respectively displaying information corresponding to a host computer under a booting state or a standby state in accordance with a third embodiment of the present invention. As shown, the difference between the third preferred embodiment and the second preferred embodiment is that there has a displaying signal controller 4 electrically connected between the BMC 2 and the displaying signal port protector 131 in accordance with the third preferred embodiment. The displaying signal controller 4 can be selected from a group including a VGA controller, a HDMI controller, and a DVI controller. However, the present invention is not so restricted.

In the third preferred embodiment, the displaying signal S3 is outputted from the displaying signal controller 4. That is, the displaying signal S3 is outputted after the displaying signal controller 4 processes the displaying information with the content being controlled by the BMC 2. The other portions of the present embodiment are identical to the first preferred embodiment and the second preferred embodiment, and thus are not repeated here.

Figure 6:
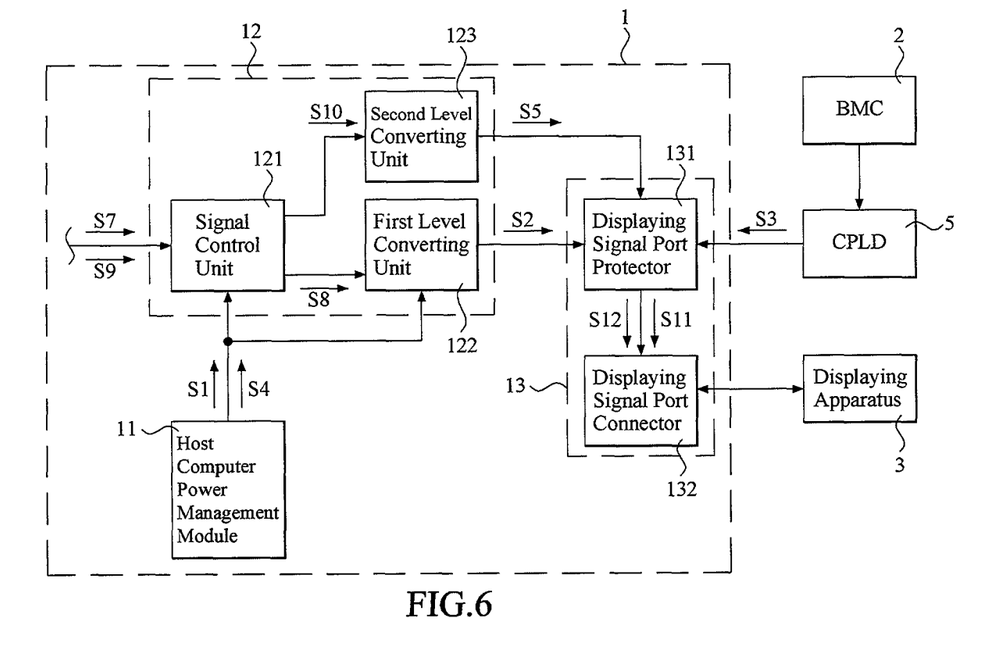
FIG. 6 is a block diagram showing the computing system for respectively displaying information corresponding to a host computer under a booting state or a standby state in accordance with a fourth embodiment of the present invention.

FIG. 6 is a block diagram showing the computing system for respectively displaying information corresponding to a host computer under a booting state or a standby state in accordance with a fourth embodiment of the present invention. As shown, the difference between the fourth preferred embodiment and the second preferred embodiment is that there has a Complex Programmable Logic Device (CPLD) 5 electrically connected between the BMC 2 and the displaying signal port protector 131. That is, the displaying signal S3 is outputted by the CPLD 5. Concretely speaking, the displaying information with the content being controlled by the BMC 2 is processed and outputted by the CPLD 5 so as to trigger the displaying apparatus 3 to display the screen image as shown in FIG. 4. The other portions of the present embodiment are identical to the first preferred embodiment and the second preferred embodiment, and thus are not repeated here.

Figure 7:
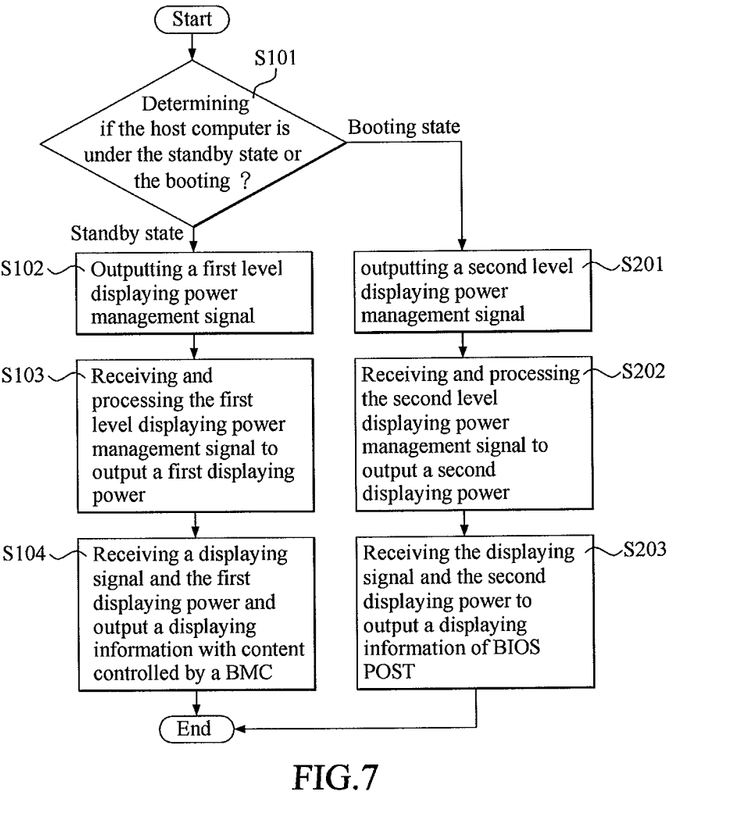
FIG. 7 is a flow chart showing the method for respectively displaying information corresponding to a host computer under a booting state or a standby state in accordance with a first embodiment of the present invention.

Please refer to FIGS. 1 to 7, wherein FIG. 7 is a flow chart showing the method for respectively displaying information corresponding to a host computer under a booting state or a standby state in accordance with a first embodiment of the present invention. As shown, the displaying method in accordance with the first preferred embodiment of the present invention comprises the steps of:

Step S101: determining if the host computer is under the standby state or the booting state;

Step S102: outputting a first level displaying power management signal;

Step S103: receiving and processing the first level displaying power management signal to output a first displaying power;

Step S104: receiving a displaying signal and the first displaying power and output a displaying information with content controlled by a BMC;

Step S201: outputting a second level displaying power management signal;

Step S202: receiving and processing the second level displaying power management signal to output a second displaying power;

Step S203: receiving the displaying signal and the second displaying power to output a displaying information of BIOS POST.

It should be noted that all the steps mentioned above are corresponding to the computing system 1 in accordance with the first preferred embodiment of the present invention as shown in FIG. 1. Concretely speaking, the steps S101, S102, and S201 are carried out by the host computer power management module 11, the steps S103 and S202 are carried out by the operating module 12, and the steps S104 and S203 are carried out by the displaying module 13. The other technical details can be referred to the description corresponding to the computing system 1 in accordance with the first preferred embodiment.

In addition, in the other embodiments (such as the second, the third, and the fourth preferred embodiments), the displaying signals S3 and S6 of the steps S104 and S203 may be a VGA signal, a HDMI signal, or a DVI signal, and the displaying signals S3 and S6 may be outputted by at least one selected from a group including the Baseboard Management Controller (BMC) 2, a displaying signal controller 4, and a Complex Programmable Logic Device (CPLD) 5. In addition, the content of the displaying signal S3 and S6 may include at least one of the information selected from a group including structural information of the BMC 2, daily record of the BMC 2, and structural information of the CPLD 5.

In addition, the displaying signal controller 4 may be a VGA controller, a HDMI controller, or a DVI controller. In addition, the BMC 2 may output the displaying information with the controlled content directly; have the displaying information with the content controlled by the BMC 2 outputted after being processed by the displaying signal controller 4; or have the displaying information with the content controlled by the BMC 2 outputted after being processed by the CPLD 5.

In addition, it should be noted that, in accordance with the other embodiments of the method for respectively displaying information corresponding to a host computer under a booting state or a standby state, for example, the methods corresponding to the computing system 1 of the second, the third, and the fourth preferred embodiments, the step S102 may further output a first level displaying power enable signal S7, and the step S103 may further receive the first level displaying power enable signal S7, output a first level displaying power state signal S8 according to the first level displaying power enable signal S7 and the first level displaying power management signal S1, and receive the first level displaying power management signal S1 and the first level displaying power state signal S8 so as to output the first displaying power S2. The step S201 may further output a second level displaying power enable signal S9, and the step S202 may further receive the second level displaying power enable signal S9, output a second level displaying power state signal S10 according to the second level displaying power enable signal S9 and the second level displaying power management signal S4, and receive the second level displaying power state signal S10 to output the second displaying power S5. The other portions of the embodiments can be referred to the computing system 1 of the second, the third and the fourth preferred embodiment and thus are not repeated here.

In conclusion, by using the computing system and the method for respectively displaying information corresponding to a host computer under a booting state or a standby state provided in accordance with the present invention, because the user can access the corresponding displaying information from the host computer no matter the host computer is under the booting state or the standby state, thus, the user can access the information without the need to reboot the host computer as the host computer is under the standby state such that the operating efficiency can be enhanced and the operation would be more convenient for the user.

The detail description of the aforementioned preferred embodiments is for clarifying the feature and the spirit of the present invention. The present invention should not be limited by any of the exemplary embodiments described herein, but should be defined only in accordance with the following claims and their equivalents. Specifically, those skilled in the art should appreciate that they can readily use the disclosed conception and specific embodiments as a basis for designing or modifying other structures for carrying out the same purposes of the present invention without departing from the scope of the invention as defined by the appended claims.

I claim:

1. A computing system for respectively displaying information corresponding to a host computer under a booting state or a standby state, comprising:
    a host computer power management module, outputting a first level displaying power management signal when the host computer is under the standby state and outputting a second level displaying power management signal when the host computer is under the booting state;
    an operating module, electrically connected to the host computer power management module, receiving and processing the first level displaying power management signal to output a first displaying power when the host computer is under the standby state, and receiving and processing the second level displaying power management signal to output a second display power when the host computer is under the booting state; and
    a displaying module, electrically connected to the operating module, receiving a displaying signal and the first displaying power and outputting a displaying information with content being controlled by a baseboard management controller (BMC) when the host computer is under standby state, and receiving the displaying signal and the second displaying power and outputting a displaying information of Basic Input/Output System (BIOS) power-on self test (POST) when the host computer is under the booting state.

2. The computing system for respectively displaying information corresponding to a host computer under a booting state or a standby state of claim 1, wherein the displaying signal is a Video Graphics Array (VGA) signal, a High Definition Multimedia Interface (HDMI) signal, or a Digital Visual Interface (DVI) signal.

3. The computing system for respectively displaying information corresponding to a host computer under a booting state or a standby state of claim 1, wherein the displaying signal is outputted by at least one selected from a group including the Baseboard Management Controller (BMC), a displaying signal controller, and a Complex Programmable Logic Device (CPLD).

4. The computing system for respectively displaying information corresponding to a host computer under a booting state or a standby state of claim 3, wherein the Baseboard Management Controller outputs the content controlled by the Baseboard Management Controller directly, or outputs the content controlled by the Baseboard Management Controller after being processed by the displaying signal controller, or outputs the content controlled by the Baseboard Management Controller through after being processed by the Complex Programmable Logic Device.

5. The computing system for respectively displaying information corresponding to a host computer under a booting state or a standby state of claim 3, wherein the displaying signal controller is a VGA controller, a HDMI controller, or a DVI controller.

6. The computing system for respectively displaying information corresponding to a host computer under a booting state or a standby state of claim 1, wherein content of the displaying signal is at least one selected from a group including structural information of the Baseboard Management Controller, daily record of the Baseboard Management Controller, and structural information of a Complex Programmable Logic Device.

7. The computing system for respectively displaying information corresponding to a host computer under a booting state or a standby state of claim 1, wherein the first displaying power is a system AC power, and the second displaying power is a system DC power.

8. The computing system for respectively displaying information corresponding to a host computer under a booting state or a standby state of claim 1, wherein the operating module comprises:
    a signal control unit, receiving a first level displaying power enable signal and the first level displaying power management signal to output a first level displaying power state signal when the host computer is under the standby state, and receiving a second level displaying power enable signal and the second level displaying power management signal to output a second level displaying power state signal when the host computer is under the booting state;
    a first level converting unit, receiving the first level displaying power management signal and the first level displaying power state signal to output the first displaying power when the host computer is under the standby state, and receiving the second level displaying power management signal and the second level displaying power state signal to cease output when the host computer is under the booting state; and
    a second level converting unit, receiving the first level displaying power state signal to cease output when the host computer is under the standby state, and receiving the second level displaying power state signal to output the second displaying power when the host computer is under the booting state.

9. The computing system for respectively displaying information corresponding to a host computer under a booting state or a standby state of claim 1, wherein the displaying module comprises:
    a displaying signal port protector, receiving and processing the displaying signal to output a displaying protecting signal;
    a displaying signal port connector, electrically connected to a displaying apparatus, for receiving and transmitting the displaying protecting signal to the displaying apparatus;
    wherein, the displaying signal port protector and the displaying signal port connector receive and output the first displaying power to the displaying apparatus when the host computer is under the standby state, and the displaying signal port protector and the displaying signal port connector receive and output the second displaying power to the displaying apparatus when the host computer is under the booting state.

10. A method for respectively displaying information corresponding to a host computer under a standby state or a booting state, comprising the steps of:
   (a) determining if the host computer is under the standby state or the booting state;
   (b) if the determination of step (a) shows to be under the standby state, outputting a first level displaying power management signal;
   (c) receiving and processing the first level displaying power management signal to output a first displaying power;
   (d) receiving a displaying signal and the first displaying power and outputting a displaying information with content controlled by a Baseboard Management Controller (BMC);
   (e) determination of step (a) shows to be under the booting state, outputting a second level displaying power management signal;
   (f) receiving and processing the second level displaying power management signal to output a second displaying power; and
   (g) receiving the displaying signal and the second displaying power and outputting a displaying information of BIOS POST.

11. The method for respectively displaying information corresponding to a host computer under a standby state or a booting state of claim 10, wherein in the steps (d) and (g), the displaying signal is a VGA signal, a HDMI signal, or a DVI signal.

12. The method for respectively displaying information corresponding to a host computer under a standby state or a booting state of claim 10, wherein in the steps (d) and (g), the displaying signal is outputted by at least one selected from a group including the Baseboard Management Controller (BMC), a displaying signal controller, and a Complex Programmable Logic Device (CPLD).

13. The method for respectively displaying information corresponding to a host computer under a standby state or a booting state of claim 12, wherein in the step (d), the Baseboard Management Controller outputs the content controlled by the Baseboard Management Controller directly, or outputs the content controlled by the Baseboard Management Controller after being processing by the displaying signal controller, or outputs the content controlled by the Baseboard Management Controller after being processed by the Complex Programmable Logic Device.

14. The method for respectively displaying information corresponding to a host computer under a standby state or a booting state of claim 12, wherein in the steps (d) and (g), the displaying signal controller is a VGA controller, a HDMI controller, or a DVI controller.

15. The method for respectively displaying information corresponding to a host computer under a standby state or a booting state of claim 10, wherein in the steps (d) and (g), content of the displaying signal is at least one selected from a group including structural information of the Baseboard Management Controller, daily record of the Baseboard Management Controller, and structural information of a Complex Programmable Logic Device.

16. The method for respectively displaying information corresponding to a host computer under a standby state or a booting state of claim 10, wherein the step (b) further comprises outputting a first level displaying power enable signal, the step (c) further comprises receiving the first level displaying power enable signal, outputting a first level displaying power state signal according to the first level displaying power enable signal and the first level displaying power management signal, and receiving the first level displaying power management signal and the first level displaying power state signal to output the first displaying power.

17. The method for respectively displaying information corresponding to a host computer under a standby state or a booting state of claim 10, wherein the step (e) further comprises outputting a second level displaying power enable signal, the step (f) further comprises receiving the second level displaying power enable signal, outputting a second level displaying power state signal according to the second level displaying power enable signal and the second level displaying power management signal, and receiving the second level displaying power state signal to output the second displaying power.

* * * * *